United States Patent Office 2,805,133
Patented Sept. 3, 1957

2,805,133

PREPARATION OF PURE SILICON

Carl Marcus Olson, Newark, Del., assignor to E. I. du Pont de Nemours and Company, Wilmington, Del., a corporation of Delaware No Drawing. Application June 25, 1954,
Serial No. 439,448

13 Claims. (Cl. 23—223.5)

This invention relates to the manufacture of elemental hyperpure silicon and more particularly to an improved process for effecting the preparation of that product through removal of minor impurities from silicon halides from which the hyperpure silicon is obtained. More specifically, it relates to an improved process for removing minor impurities from silicon chlorides to obtain hyperpure silicon.

As is known, relatively pure silicon can be prepared by the vapor phase reduction of redistilled silicon tetrachloride with commercial-grade pure (99.99%) zinc. The silicon product from these reactants, however, will contain traces of undesired metal contaminants and up to as much as .03% of carbon. For the most sensitive electric uses, silicon of higher purity is required because the presence of even trace amounts of impurities proves detrimental for the most exacting semiconductor requirements in the newer electronic applications, such as transistors and the like.

Commercial high-purity silicon tetrachloride is prepared by chlorinating the purest commercially available electro-furnace silicon. Because electro-furnace silicon is made by the reduction of silica in the presence of carbon or graphite, this source of metal always contains appreciable amounts of carbon and other impurities. As these impurities are readily chlorinated along with the silicon and are difficult or impossible to separate from it by distillation or other known means, the purest commercial silicon tetrachloride usually retains objectionable minor or trace amounts of chloro- or oxychloro- or other complex chloro-compounds of such elements as carbon, boron, iron, copper, tin, aluminum, titanium, chromium, nickel, vanadium, phosphorus, and others, as well as oxychloro-compounds of silicon.

It is among the objects of this invention to overcome these and other disadvantages of prior elemental silicon products and their preparation, and to provide novel and effective procedures for obtaining a hyperpure, satisfactory form of silicon product. A particular object is to provide an improved method for producing pure, elemental silicon by the vapor phase reduction of relatively pure silicon halides with a relatively pure elemental metal reductant. A further object is to provide a novel process for producing hyperpure silicon of improved electrical semiconductor quality. An additional object is to provide an improved process for purifying silicon halides. Further objects and advantages of the invention will appear from the ensuing detailed description of the invention.

These objects are accomplished by this invention which broadly comprises passing high-purity silicon tetrahalide vapor over a high-temperature scavenging bed of elemental high-purity silicon, charging a stream of the effluent vapor therefrom and a stream of a vaporized high-purity elemental metal reductant, selected from the group consisting of zinc and cadmium, into a vapor phase reduction reactor, removing the vaporous by-products and unreacted reactants from said reactor, and recovering the hyperpure elemental silicon product which deposits therein.

More specifically, the invention comprises passing silicon tetrachloride vapor containing contaminating elements in minor amounts directly over a scavenging bed of elemental silicon particles of high purity maintained within a treating zone and at a temperature ranging from about 800° C. to 1100° C., passing a stream of the resulting purified silicon tetrachloride vapor which emerges therefrom and a stream of elemental zinc vapor of high purity as a reductant into a reduction reactor maintained above the dew point of said elemental zinc metal reductant and the dew point of its halide reaction product, removing the by-products and unreacted reactants in the vapor state, and recovering the hyperpure elemental silicon deposited within said reactor.

In a more specific, preferred embodiment the invention comprises passing a heated stream of silicon tetrachloride vapor containing trace amounts of contaminating elements over a scavenging bed of elemental, high-purity silicon particles, said bed being maintained at a temperature within the range of 850–925° C., maintaining said silicon tetrachloride vapor in direct contact with said bed for a period of about .1 to 10 seconds to thereby deposit said contaminating elements thereon, passing the resulting purified silicon tetrachloride as a heated stream and a stream of pure elemental zinc vapor simultaneously and continuously into a closed vapor phase reduction reactor maintained at a temperature within the range of about 907° C. to 1100° C., for admixture and reaction therein with a prevailing slight, stoichiometric excess of silicon tetrachloride, removing in the vapor phase by-product zinc chloride and unreacted reactants from said reactor, discontinuing zinc vapor addition while maintaining said reactor at the indicated reaction temperature in the presence of silicon chloride vapor, and recovering the elemental silicon deposited in said reactor.

In one practical adaptation, silicon tetrachloride of the purest commercially available quality, such as is produced by the chlorination of electro-furnace silicon, and containing minor or trace amounts of the contaminating compounds or elements mentioned, is first subjected to a repurification treatment. This is preferably effected in silica equipment by passing, in accordance with the disclosure of my copending application Ser. No. 439,447, filed June 25, 1954, a heated stream of the silicon tetrachloride vapor over a pyrolyzing bed of fused silica rings maintained at a temperature of about 1000° C. and while using a flow rate such that the silicon tetrachloride vapor retention within the pyrolyzing zone is about 2–3 seconds. The vapor emerging from the bed is then condensed and about one mole of water per 100 moles of silicon tetrachloride is added to the silicon tetrachloride. After allowing the water-treated silicon tetrachloride to stand for a few hours, the mixture is subjected to distillation to separate the contaminants formed by pyrolysis and hydrolysis or otherwise made non-volatile by the foregoing treatment. The resulting silicon tetrachloride product will be free of contaminating chloro-, oxychloro-, and complex chloro compounds of carbon, boron, titanium, aluminum, and silicon, as determinable by infra-red and spectroscopy methods. It can be vaporized in a continuous stream by dropping or otherwise contacting it with fused silica chips maintained at a temperature ranging from about 600–700° C. in a fused silica flask in an associated reaction system fabricated entirely of fused silica. Said system can comprise a preheating coil, a scavenging bed, a vapor phase reduction reactor, a vaporizer, and a preheater for the elemental zinc or cadmium reductant. The scavenging bed can consist of loosely packed particles of very pure elemental silicon, screened to an approximately 2–4 mesh size. This bed is maintained at a temperature within the range of about 850–925° C. The amount of scavenging silicon used in such bed can be varied, depending on the length of effective service required from a given bed. An average retention time for silicon tetrachloride within the bed of about one second is preferred, although from .1 to 10 seconds and longer periods are effectively utilizable. The stream of hyperpure silicon tetrachloride leaving the scavenging bed is passed directly and simultaneously with a heated stream of, preferably, about 99.999% purity elemental zinc vapor into the reduction reactor. The two heated streams of vapor reactants are immediately and continuously mixed within the reactor maintained at about 950° C. by external heating. The reaction by-products, including zinc chloride and unreacted reactants, are removed from the reaction space as vapor, and upon sufficient silicon product being formed, zinc vapor addition is discontinued. After allowing the silicon tetrachloride vapor to pass through the reactor for about an hour and while the reactor is still at reaction temperature, further silicon tetrachloride flow is stopped, and the hyperpure elemental silicon deposited in the reaction vessel is removed after cooling. The product yield, based on the silicon tetrachloride fed into the system is usually about 50%, not including that fed in stoichiometric excess of the zinc.

To a clearer understanding of the invention, the following illustrative, specific examples are given. These are not to be considered as in limitation of the invention.

*Example I*

Commercially pure silicon tetrachloride previously purified by distillation and containing minor amounts of such impurities as chloro-, oxychloro- and complex chloro-compounds of carbon, boron, iron, copper, aluminum, tin, titanium, chromium, nickel, vanadium, and phosphorus was employed as a starting raw material source for silicon. A preliminary purification thereof was effected by passing a heated stream of the silicon tetrachloride over a pyrolyzing zone, condensing the effluent gas, adding a small amount of water and separating the pyrosynthesized and complexed contaminants by conventional distillation. These steps and the entire process of this example were carried out in all-welded silica equipment. The pyrolyzing zone comprised a silica chamber packed with silica rings and was maintained at a temperature of about 1000° C. A flow rate of silicon tetrachloride was used which afforded a vapor retention time over the pyrolyzing bed of about 2–3 seconds. The vapor emerging from the heated pyrolyzing bed was condensed and about one mole of water per 100 moles of silicon tetrachloride was added to the condensed silicon tetrachloride, following which the mixture was allowed to stand at room temperature for two days and was then subjected to fractionation to recover highly purified silicon tetrachloride as a distillate from which, particularly, carbon, boron, and oxygen-containing contaminants had been eliminated. This highly purified silicon tetrachloride was then continuously revaporized at about 33 cubic centimeters per minute in a flash vaporizer consisting of a closed silica flask partly filled with silica chips and maintained at a temperature of about 600–700° C. The silicon tetrachloride vapor issuing from this vaporizer was passed through associated silica tubing into a preheating zone maintained at about 900° C. and thence into a scavenging bed of pure silicon particles in an enclosed, associated silica tower, said bed being maintained at a temperature within the range of about 850° C. to 925° C. This scavenging bed comprised about five pounds of about 10 mesh elemental silicon obtained from pure commercial silicon tetrachloride and pure elemental zinc by vapor phase reduction at about 1000° C., the aggregated product therefrom having been ground gently and screened to provide a fairly uniform particle size material having a 6–10 mesh range and through which the heated silicon tetrachloride could be readily passed without undue back pressure developing. A vapor retention time over the bed of silicon of about one second was employed in the operation. The silicon particles became darker in color during the process, due to the coating of adsorbed impurities thereon which were removed from the silicon tetrachloride. A stream of the purified silicon tetrachloride was then passed directly into the vapor phase reduction reactor, maintained by external heating at a temperature of about 1000° C., simultaneously with a stream of about 99.999% purity elemental zinc vapor, the two streams being immediately and continuously mixed within said reactor. The reactor consisted of a horizontally positioned, fused silica cylinder about 8 inches in diameter and 6 feet long, the two reactants being conducted into it in fused silica tubing horizontally positioned therein and passing through the reactor entrance end wall in closely adjacent, parallel relationship to each other, whereby immediate mixing of the reactant streams occurred upon their introduction into the reactor. The zinc vapor feed rate was about 34 grams per minute, being vaporized in an associated boiler of fused silica and passing into the reactor through connecting silica tubing while a 5% to 10% excess of silicon tetrachloride over the amount of zinc in the reactor was maintained. Hyperpure silicon formed was continuously deposited within the reactor, and reaction by-product zinc chloride, unreacted silicon tetrachloride and unreacted zinc vapor were removed therefrom as vapor through an exit at the end of the reactor. A period of about 40 hours' operation took place during which period the reaction space within the reactor became almost filled with deposited elemental silicon of extremely high purity. The flow of reactants, including zinc vapor addition, was discontinued and, after allowing silicon tetrachloride vapor to pass through the reactor for about an hour while said reactor was still at reaction temperature, silicon tetrachloride addition was also discontinued. The reactor was then cooled to allow recovery of its silicon product which represented a yield of about 50% based on the silicon tetrachloride fed which was equivalent to the zinc.

*Example II*

Silicon tetrachloride of high purity was used as a starting material. This was obtained by passing the tetrachloride as a vapor over a pyrolyzing bed of silica chips maintained at about 1000° C. to effect purification thereof, after which it was condensed and given a water treatment, and thereafter distilled to eliminate traces of contaminating impurities. A stream of this pure silicon tetrachloride product was vaporized at a rate of about 50 cubic centimeters a minute in all-welded silica equipment, preheated to about 900° C., and then passed over a scavenging bed of high-purity silicon particles of the type used in Example I and within a treating zone maintained at about 900° C. The size of the zone was such that the unitary retention time of the vapor within the zone was about .2 second. The effluent vapor emerging from the bed and zone was condensed and a silicon tetrachloride of extremely high purity was obtained which when reacted with pure zinc in the manner described in Example I provided a hyperpure silicon product.

*Example III*

Commercially pure silicon tetrachloride of the type used in Example I was vaporized and heated in all-welded silica equipment and passed into a scavenging bed of silicon particles in an associated, closed silica tower maintained at about 1100° C. The bed comprised pure, elemental silicon of uniform particle size ranging from about 4–6 mesh, made from pure commercial silicon tetrachloride and pure elemental zinc by vapor phase reduction at about 1000° C. The vapor retention time over the bed was about 30 seconds, the silicon particles becoming darker as the stream of heated silicon tetrachloride was continuously passed through it. The purified silicon tetrachloride vapor recovered from the heated scavenging bed was condensed to provide a product of very high purity which, when reacted in the vapor phase with pure cadmium under substantially the conditions and procedures of Example I, resulted in production of hyperpure silicon.

*Example IV*

A stream of the very high-purity silicon tetrachloride produced by passing commercially pure silicon tetrachloride over heated silicon, as in Example III, was reheated to about 950° C. and passed into a vapor phase externally heated reduction reactor as described in Example I, along with a stream of about 99.999% purity zinc vapor. The two streams were immediately and continuously mixed within said reactor which was maintained at about 950° C. Using the same rate of flow of reactants as in Example I, the reactor was almost filled with high-purity silicon in about forty hours of continuous operation. The zinc chloride by-product and the unreacted reactants were continuously removed from the reactor in the vapor state. The very high-purity elemental silicon removed from the reactor after cooling was of improved transistor quality compared to that produced from the same type of zinc and the same type of commercially pure silicon tetrachloride not so subjected to purification by scavenging by means of heated pure silicon.

*Example V*

A sample of high-purity silicon tetrachloride was contaminated by saturating it with phosphorus pentachloride. By analysis it was found to contain 0.015 percent by weight of phosphorus. A heated stream of this contaminated silicon tetrachloride was passed over a scavenging bed of silicon particles maintained at 1100° C., as described in Example III. The purified condensed silicon tetrachloride product recovered contained no phosphorus and when reacted in the vapor phase with pure zinc, as described in Example I, provided a hyperpure silicon product.

The mechanism by which the scavenging bed of silicon removes the trace contaminants from silicon halide vapor is not completely understood at present. Presumably, the heated silicon adsorbs these materials from the silicon halide vapor being passed through the bed. Whether or not the contaminating compounds are chemically reduced or chemically reacted to form silicides is not known. It has been observed, however, that the surface of the silicon particles used in the bed becomes coated with film, decreasing its light reflection characteristics.

The silicon employed as a scavenger herein is of much higher purity than any commercially available electrofurnace grade of silicon. The size thereof is not known to be critical, as long as the particles are of sufficient size to form a loosely packed bed through which the silicon tetrachloride vapor can be passed without undue flow resistance and at the same time small enough to present a large surface area. Thus large aggregated particles can be broken down to the desired size by mild grinding, or fine powder-like material can be compacted or pelletized, to the desired size. While a particle size of from 2 to 16 mesh has been found to be most convenient for use, if desired, smaller or larger size particles can also be utilized.

The contact time of the silicon halide over the heated scavenging bed of silicon will depend upon the types and amounts of contaminating compounds present in the halide, the type of silicon aggregate used, and the bed temperature. Sufficient contact time is had to allow for the scavenging or adsorption reactions to take place and obtain complete purification of the silicon halide vapor. This usually ranges from about .5 to 5 seconds at the temperature indicated in the preferred adaption of the invention. If desired, recourse to from about .1 to 10 seconds and higher contact times can be employed.

The pyrolyzing zone is maintained at a temperature above 600° C. To obtain best results, however, a temperature above that to which the silicon halide is to be subjected in the silicon halide reduction reactor is used. Preferably, and to obtain complete conversion of the contaminating compounds to species removable from silicon tetrachloride, temperatures within a range of about 975° C. to 1200° C. are used. The silicon halide vapor entering the pyrolyzing zone is preferably preheated by external means to a temperature close to that at which the pyrolyzing zone is maintained during operation. Such zone can comprise an area of heat transfer surface such as an unpacked tube of inert, non-contaminating refractory, as for example silica, or a pervious bed of packing of similar material enclosed in a suitable tube, chamber, or tower. Silica is particularly adaptable for use since it can be obtained in a state of fairly high purity, readily fabricated and welded to form continuous and completely enclosed apparatus. Packing material such as rings, chips, or fragments of 2–16 mesh or larger size are also suitable for use. In instances where silica is used as the pyrolyzing surface for silicon tetrachloride, some decomposition of the silica takes place, particularly at the higher temperature ranges due to chlorination by the silicon tetrachloride.

The contact time of the silicon tetrachloride over the heated pyrolyzing zone surface is dependent upon the types and amounts of contaminating compounds, as well as the temperature at which the zone is maintained. Sufficient contact time is provided to allow for pyro-synthesizing reactions to take place to obtain compounds sufficiently changed in molecular weight for easy separation from the silicon tetrachloride. Usually about 1–5 seconds at the temperature indicated is sufficient; however, from ½ a second to a minute and longer can be utilized.

The scavenging bed of silicon is maintained through external heating at a relatively high temperature, usually above 600° C. With silicon tetrachloride a temperature within the range of about 850° C. to 925° C. is preferred for use, although temperatures ranging from about 800° C. to 1100° C. are also effectively useful. The halide vapor entering the scavenging zone is preferably preheated by external means to a temperature close to that at which the scavenging zone is maintained during operation.

The temperature of the reduction reaction zone is maintained above the condensation temperature of the elemental metal reductant and its halide reaction product and below the melting point of the elemental silicon being produced. The silicon halide entering the reduction reaction zone is preferably preheated to a temperature close to that at which the reduction reaction zone is being maintained during operation.

The reduction reaction can be carried out using up to 50 percent by weight excess or deficiency of silicon tetrachloride over zinc, based on the equation:

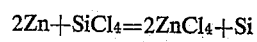

$$2Zn + SiCl_4 = 2ZnCl_2 + Si$$

although, preferably, from about 5 to 10 percent is used. In order to further insure a hyperpure product, the flow of silicon tetrachloride is maintained through the reaction zone for a short period of time after the flow of zinc vapor has been discontinued at the end of the continuous reaction period.

The pressure at which the silicon halide over the silicon is maintained is not known to be critical. While pressures very close to atmospheric have been found to be satisfactory, higher or lower pressures can be used if desired. The pressures of the interconnected and interrelated zinc vaporization system and reduction reactor system are of course kept in balance in the silicon tetrachloride scavenging system. Also the pressure over the pyrolyzing bed is maintained close to atmospheric.

The addition of water to the silicon halide is preferably done after passing the silicon halide vapor over the pyrolyzing bed of silica particles or rings maintained at a high temperature. However, this step can be effectively performed before passing the silicon halide over said pyrolyzing bed if desired. The amount of water added to the silicon halide is usually a minor amount with the range of .01 to 10 mole percent based on the silicon halide, although about one mole percent is preferred and up to 50 mole percent can be used if desired. The water can be added dropwise as a liquid or as ice over an extended period, with agitation, or can be added by passing a water-saturated inert gas, as for example argon or nitrogen, through the liquid silicon halide. The separation of the hydrolyzed, hydrated, and otherwise water-complexed contaminants can be made immediately after the addition of water, or can be delayed for several hours or several days.

While particularly adaptable to silicon tetrachloride, the process of the invention is applicable to the silicon halides generally. Thus, in addition to silicon tetrachloride other silicon halides including disilicon hexachloride, silicon tetrabromide, silicon tetrafluoride, and the like, can be advantageously treated in accordance with the invention.

If desired, an inert carrier gas such as nitrogen, hydrogen, argon, helium, or other gas selected from the eighth group of the periodic table can be used to assist in conveying the silicon halide or vaporized zinc through the equipment, and to control the reaction conditions.

Among the advantages of this process, it is noteworthy that the process of the invention provides a method of producing not only a superior quality silicon for use in transistors and other electronic semiconductor equipment, but also provides a method of obtaining silicon halides of extremely high purity, if instead of passing the scavenged silicon halide into the reduction reactor for production of silicon, the purified silicon tetrahalide is recovered as such. Such extremely high-purity silicon tetrahalide can be used, for example, for the production of extremely high-purity silica and other silica compounds.

I claim as my invention:

1. A process for preparing hyperpure elemental silicon which comprises removing trace impurities from a relatively pure silicon halide by passing said halide in the vapor state into contact with a scavenging bed of pure, elemental silicon at an elevated temperature, reacting the effluent halide vapor resulting from said contact with a pure vaporized metal reductant selected from the group consisting of zinc and cadmium within a reaction zone maintained at a temperature in excess of the dew point of said reductant and its halide reaction product, but below the melting point of the silicon being deposited in the reaction chamber, depositing the desired elemental silicon product in said zone while exiting metal halide-bearing gases therefrom, discontinuing the reaction, cooling said reaction zone and recovering the elemental silicon product in a cooled state.

2. A process for preparing hyperpure elemental silicon comprising removing trace impurities from a relatively pure silicon halide by charging said halide in the vapor state into direct contact with a scavenging bed of pure elemental silicon maintained at an elevated temperature, mixing the effluent halide vapor resulting from said contact with a pure, vaporized metal reductant selected from the group consisting of zinc and cadmium within a reaction zone maintained at a temperature in excess of the dew point of said reductant metal and its halide reaction product, but below the melting point of the silicon being deposited in the reaction chamber depositing elemental silicon formed in said reaction zone while exiting metal halide-bearing gases therefrom, discontinuing the reaction, cooling said reaction zone and recovering the elemental silicon product in a cooled state.

3. A process for preparing hyperpure elemental silicon comprising removing trace impurities from a relatively pure form of silicon tetrachloride by passing said tetrachloride in the vapor state into direct contact with a scavenging bed of pure elemental silicon maintained at an elevated temperature, reacting the effluent chloride vapor resulting from said contact with a pure, vaporized metal reductant selected from the group consisting of zinc and cadmium within a reaction zone which is maintained at a temperature in excess of the dew point of said reductant metal and its chloride reaction product, but below the melting point of the silicon being deposited in the reaction chamber, depositing elemental silicon product formed in said zone while exiting metal chloride-bearing gases therefrom, discontinuing the reaction, cooling said reaction zone and recovering the pure elemental silicon product in a cooled state.

4. In a process for preparing hyperpure elemental silicon by reacting a relatively pure silicon halide in the vapor state with a pure vaporized metal reductant selected from the group consisting of zinc and cadmium, the improvement which comprises prior to effecting said reaction scavenging the silicon halide reactant by passing the same in vapor state through a bed of hot granular pure silicon maintained at a temperature ranging from about 800° C.–1100° C.

5. An improved process for manufacturing hyperpure elemental silicon from a halide of silicon of high purity and zinc of high purity, comprising removing trace impurities from said silicon halide by passing it in vapor state into contact with a scavenging bed of elemental silicon of high purity maintained at an elevated temperature, combining the effluent halide vapor subsequent to its contact with a bed of elemental silicon with a vaporous stream of the zinc reactant while the vaporous mixture of the reactants is confined in a reaction chamber maintained at a temperature in excess of the dew point of the metal reactant but below the melting point of the silicon being deposited in the reaction chamber, continuing the admixing of the two reactants within the reaction chamber where the elemental silicon product is deposited while exiting metal halide-bearing gases therefrom and recovering said elemental silicon product after discontinuing the addition of the reactants and cooling of the apparatus.

6. An improved process for the manufacture of hyperpure elemental silicon from silicon tetrahalide of high purity and elemental zinc of high purity which comprises removing trace impurities from the silicon tetrachloride by passing the chloride as a vapor into contact with a scavenging bed of elemental silicon of high purity, combining the effluent chloride vapor subsequent to its contact with the bed of elemental silicon with a vaporous stream of the zinc reactant while the vaporous mixture of the reactants is confined in a reaction chamber maintained at a temperature in excess of the dew point of zinc but below the melting point of the silicon being deposited in the reaction chamber, continuing the admixing of the two reactants within the reaction chamber where the elemental silicon product is deposited while exiting metal halide-bearing gases therefrom and recovering said elemental silicon product after discontinuing the addition of the reactants and cooling of the apparatus.

7. An improved process for the manufacture of hyperpure elemental silicon from silicon tetrahalide of high purity and commercial zinc of high purity which comprises removing trace impurities from the halide of silicon by passing the halide as a vapor into contact with a scavenging bed of elemental silicon of high purity contained in a silica chamber, combining the effluent halide vapor subsequent to its contact with a bed of elemental silicon with a vaporous stream of zinc while the vaporous mixture of the reactants is confined within silica apparatus maintained at a temperature in excess of the boiling point of zinc but below the melting point of the silicon being deposited in the reaction chamber, continuing the admixing of the two reactants within the reaction chamber where the elemental silicon product is deposited while exiting metal halide-bearing gases therefrom and recovering said elemental silicon product after discontinuing the addition of the reactants and cooling of the apparatus.

8. An improved process for the manufacture of hyperpure elemental silicon from silicon tetrahalide of high purity and commercial zinc of high purity which comprises first removing trace impurities from the halide of silicon by passing the halide as a vapor into contact with a scavenging bed of elemental silicon of high purity, combining the effluent halide vapor subsequent to its contact with a bed of elemental silicon with a vaporous stream of zinc while the vaporous mixture of the reactants is confined within silica apparatus maintained at a temperature within the range of 907° C. and 1100° C., continuing the admixing of the two reactants within the said silica apparatus where the elemental silicon product is deposited while exiting zinc halide-bearing gases therefrom and recovering said elemental silicon product after the addition has been discontinued and the apparatus cooled.

9. An improved process for the manufacture of hyperpure elemental silicon from silicon tetrachloride of high purity and commercial zinc of high purity which comprises first removing trace impurities from the silicon tetrachloride by passing the tetrachloride as a vapor into contact with the scavenging bed of elemental silicon of high purity, combining the effluent chloride vapor subsequent to its contact with the bed of elemental silicon with a vaporous stream of the zinc reactant while the vaporous mixture of the reactants is confined within silica apparatus maintained at a temperature in excess of the boiling point of zinc but below the melting point of the silicon being deposited in the reaction chamber, continuing the admixing of the two reactants within the said silica apparatus where the elemental silicon product is deposited while exiting zinc chloride-bearing gases therefrom and recovering said elemental silicon product after the reagent addition has been discontinued and the apparatus cooled.

10. An improved process for the manufacture of hyperpure elemental silicon from silicon tetrachloride of high purity and commercial zinc of high purity which comprises first removing trace impurities from the silicon tetrachloride by passing the chloride as a vapor into contact with a scavenging bed of elemental silicon of high purity, combining the effluent halide vapor subsequent to its contact with the bed of elemental silicon with the vaporous stream of the metal reactant while the vaporous mixure of the reactants is also confined within silica apparatus maintained at a temperature within the range of 907° C. and 1100° C., continuing the admixing of the two reactants within the said silica apparatus where the elemental silicon product is deposited while exiting zinc chloride-bearing gases therefrom and recovering said elemental silicon product after the reagent addition has been discontinued and the apparatus cooled.

11. An improved process for the manufacture of hyperpure elemental silicon from silicon tetrabromide of high purity and commercial zinc of high purity which comprises first removing trace impurities from the silicon tetrabromide by passing the bromide as a vapor into contact with a scavenging bed of elemental silicon of high purity, combining the effluent halide vapor subsequent to its contact with the bed of elemental silicon with the vaporous stream of the metal reactant while the vaporous mixture of the reactants is also confined within silica apparatus maintained at a temperature within the range of 907° C. and 1100° C., continuing the admixing of the two reactants within the said silica apparatus where the elemental silicon product is deposited while exiting zinc bromide-bearing gases therefrom and recovering said elemental silicon product after the reagent addition has been discontinued and the apparatus cooled.

12. A process for purifying a silicon tetrahalide which comprises passing a stream of said tetrahalide in vapor state over a scavenging bed of pure, elemental silicon maintained at a temperature within the range of 800–1100° C., and recovering the purified silicon tetrahalide exited from said bed.

13. A process for the production of pure silicon tetrachloride which comprises passing a stream of said tetrachloride as a vapor over a scavenging bed of pure elemental silicon maintained in a silica container under a temperature ranging from about 800–1100° C., and recovering the purified silicon tetrachloride exited from said bed.

References Cited in the file of this patent

UNITED STATES PATENTS

| | | |
|---|---|---|
| 1,241,796 | Weaver | Oct. 2, 1917 |
| 2,594,370 | Warburton | Apr. 29, 1952 |

FOREIGN PATENTS

| | | |
|---|---|---|
| 627,904 | Great Britain | Aug. 18, 1949 |
| 656,098 | Great Britain | Aug. 15, 1951 |

OTHER REFERENCES

Lyon et al.: "J. of Electro Chemical Society," vol. 96, No. 6, December 1949, pages 359–363.